United States Patent
Filippo et al.

(10) Patent No.: US 7,415,597 B2
(45) Date of Patent: Aug. 19, 2008

(54) PROCESSOR WITH DEPENDENCE MECHANISM TO PREDICT WHETHER A LOAD IS DEPENDENT ON OLDER STORE

(75) Inventors: Michael A. Filippo, Manchaca, TX (US); James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 263 days.

(21) Appl. No.: 10/936,296

(22) Filed: Sep. 8, 2004

(65) Prior Publication Data

US 2006/0095734 A1 May 4, 2006

(51) Int. Cl.
G06F 9/30 (2006.01)
G06F 9/40 (2006.01)
G06F 9/44 (2006.01)

(52) U.S. Cl. .................. 712/218; 712/225; 712/216

(58) Field of Classification Search .................. 712/218, 712/225, 216
See application file for complete search history.

(56) References Cited

U.S. PATENT DOCUMENTS

| | | | | |
|---|---|---|---|---|
| 5,615,350 A * | 3/1997 | Hesson et al. | | 712/218 |
| 5,781,752 A | 7/1998 | Moshovos et al. | | |
| 6,415,380 B1 * | 7/2002 | Sato | | 712/217 |
| 6,502,188 B1 * | 12/2002 | Zuraski et al. | | 712/234 |
| 6,542,984 B1 * | 4/2003 | Keller et al. | | 712/214 |
| 6,658,554 B1 * | 12/2003 | Moshovos et al. | | 712/216 |
| 6,950,925 B1 * | 9/2005 | Sander et al. | | 712/215 |
| 6,970,997 B2 * | 11/2005 | Shibayama et al. | | 712/225 |
| 2003/0088760 A1 * | 5/2003 | Chowdhury et al. | | 712/225 |
| 2003/0236969 A1 * | 12/2003 | Kacevas et al. | | 712/239 |
| 2004/0143721 A1 * | 7/2004 | Pickett et al. | | 711/217 |
| 2004/0177236 A1 * | 9/2004 | Pickett | | 712/225 |
| 2004/0255101 A1 * | 12/2004 | Filippo et al. | | 712/225 |

FOREIGN PATENT DOCUMENTS

| | | |
|---|---|---|
| WO | WO 03/093982 | 11/2003 |
| WO | WO 2004/021173 | 3/2004 |

OTHER PUBLICATIONS

Authors Mikko H. Lipasti; Christopher B. Wilkerson; John Paul Shen "Value locality and load value prediction" Publisher: ACM Press Year of Publication: 1996.*

(Continued)

*Primary Examiner*—Eddie P Chan
*Assistant Examiner*—Idriss Alrobaye
(74) *Attorney, Agent, or Firm*—Robert C. Kowert; Meyertons, Hood, Kivlin, Kowert & Goetzel, P.C.

(57) ABSTRACT

A processor may include a scheduler configured to issue operations and a load store unit configured to execute memory operations issued by the scheduler. The load store unit is configured to store information identifying memory operations issued to the load store unit. In response to detection of incorrect data speculation for one of the issued memory operations, the load store unit is configured to replay at least one of the issued memory operations by providing an indication to the scheduler. The scheduler is configured to responsively reissue the memory operations identified by the load store unit.

23 Claims, 7 Drawing Sheets

OTHER PUBLICATIONS

Moshovos, A.; Sohi, G.S.; "Memory dependence speculation tradeoffs in centralized, continuous-window superscalar processors", IEEE, Pertinent pp. 1-12, Year of publication: Jan. 8, 2000.*

Black et al. "Load Execution Latency Reduction", ACM. Pertinent pp. 29-36; Year of publication: Jul. 12, 1998.*

International Search Report for PCT/US2005/022426, mailed Apr. 10, 2006.

International Search Report and Written Opinion for PCT/US2005/022426, mailed Jun. 8, 2006.

Reinman, et al., "Predictive Techniques for Aggressive Load Speculation," ACM/IEEE International Symposium on Microarchitecture, 1998, pp. 127-137.

Reinman, et al., "Predictive Techniques for Aggressive Load Speculation," ACM/IEEE International Symposium on Microarchitecture, 1998, pp. 127-137, Nov. 30, 1998.

Andreas Moshovos, et al., "Memory Dependence Prediction in Multimedia Applications," 18 pages, May 2000.

Stephan Jourdan, et al., "A Novel Renaming Scheme to Exploit Value Temporal Locality through Physical Register Reuse and Unification," Intel Corporation, IEEE, 1998, 10 pages, Dec. 1998.

Soner Onder, et al., "Load and Store Reuse Using Register File Contents," ACM 15th International Conference on Supercomputing, Sorrento, Naples, Italy, Jun. 2001, pp. 289-302, Jun. 2001.

Michael Bekerman, et al., "Early Load Address Resolution Via Register Tracking," Intel Corporation, 9 pages, Jun. 2000.

Renju Thomas, et al., "Using Dataflow Based Context for Accurate Value Prediction," 11 pages, Sep. 2001.

Mikko H. Lipasti, et al., "Exceeding the Dataflow Limit via Value Prediction," Proceedings of the 29th Annual ACM/IEEE International Symposium of Microarchitecture, Dec. 1996, 12 pages, Dec. 1996.

David M. Gallagher, et al., "Dynamic Memory Disambiguation Using the Memory Conflict Buffer," Center for Reliable and High-Performance Computing, IL, 13 pages, Oct. 1994.

Glenn Reinman, "Predictive Techniques for Aggressive Load Speculation," Published in the Proceedings of the Annual 31st International Symposium on Microarchitecture, Dec. 1998, 11 pages, Dec. 1998.

Brad Calder, et al., "A Comparative Survey of Load Speculation Architectures," Journal of Instruction-Level Parallelism I, 2000, pp. 1-39, May 2000.

* cited by examiner

PROCESSOR WITH DEPENDENCE MECHANISM TO PREDICT WHETHER A LOAD IS DEPENDENT ON OLDER STORE

BACKGROUND OF THE INVENTION

1. Field of the Invention

This invention is related to the field of processors and, more particularly, to performing data speculation in a processor.

2. Description of the Related Art

Superscalar processors achieve high performance by executing multiple instructions concurrently and by using the shortest possible clock cycle consistent with their design. However, data and control flow dependencies between instructions may limit how many instructions may be issued at any given time. As a result, some processors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation is data speculation, which predicts data values. Proposed types of data speculation include speculatively generating addresses for memory operations and speculatively generating data values for use in computational operations. As with control speculation, the underlying conditions used to speculatively generate a value are eventually evaluated, allowing the speculation to be verified or undone.

Since speculation allows execution to proceed without waiting for a speculative condition to be known, significant performance gains may be achieved if the performance gained from correct speculations exceeds the performance lost to incorrect speculations. Decreasing the performance penalties due to incorrect speculations is therefore desirable.

SUMMARY

Various embodiments of methods and systems for predicting the dependence of load operations on older (in program order) store operations in a data-speculative processor are disclosed. In one embodiment, a processor may include a scheduler configured to issue operations and a load store unit coupled to receive memory operations issued by the scheduler and configured to execute the memory operations. The load store unit may be further configured to predict whether a given load operation is dependent upon an older store operation, execute the given load operation before an address of the older store operation is computed in response to predicting that the given load operation is independent of the older store operation, detect whether the given load operation has been mispredicted subsequent to predicting that the given load operation is independent of the older store operation, and provide a replay indication to the scheduler indicating that the load operation should be reissued in response to detecting that the given load operation has been mispredicted.

In one specific implementation, the load store unit may include a local predictor comprising a plurality of local predictor entries. Each of the plurality of local predictor entries may include a dependence prediction value, and the load store unit may be further configured to predict whether the given load operation is dependent upon the older store operation comprises by accessing a given local predictor entry corresponding to the given load operation and evaluating a given dependence prediction value included in the given local predictor entry.

In another specific implementation, the load store unit may include a global predictor comprising a global history register and a plurality of global predictor entries. The global history register may be configured to store a plurality of respective dependency values corresponding to a plurality of executed load operations. Each of the plurality of global predictor entries may include a dependence prediction value. The load store unit may be further configured to predict whether the given load operation is dependent upon the older store operation by accessing a given global predictor entry corresponding to the global history register and evaluating a given dependence prediction value included in the given global predictor entry.

In yet another specific implementation, the load store unit may include a local predictor comprising a plurality of local predictor entries, where each of the plurality of local predictor entries may include a dependence prediction value, and a global predictor comprising a global history register and a plurality of global predictor entries, where the global history register may be configured to store a plurality of respective dependency values corresponding to a plurality of executed load operations, and where each of the plurality of global predictor entries may include a dependence prediction value. The load store unit may be further configured to predict whether the given load operation is dependent upon the older store operation by determining whether the given load operation is a dynamic load operation. In response to determining that the given load operation is not a dynamic load operation, the load store unit may access a given local predictor entry corresponding to the given load operation and evaluate a local dependence prediction value included in the given local predictor entry. In response to determining that the given load operation is a dynamic load operation, the load store unit may access a given global predictor entry corresponding to the global history register and evaluate a global dependence prediction value included in the given global predictor entry.

BRIEF DESCRIPTION OF THE DRAWINGS

A better understanding of the present invention can be obtained when the following detailed description is considered in conjunction with the following drawings, in which.

Figure 1:
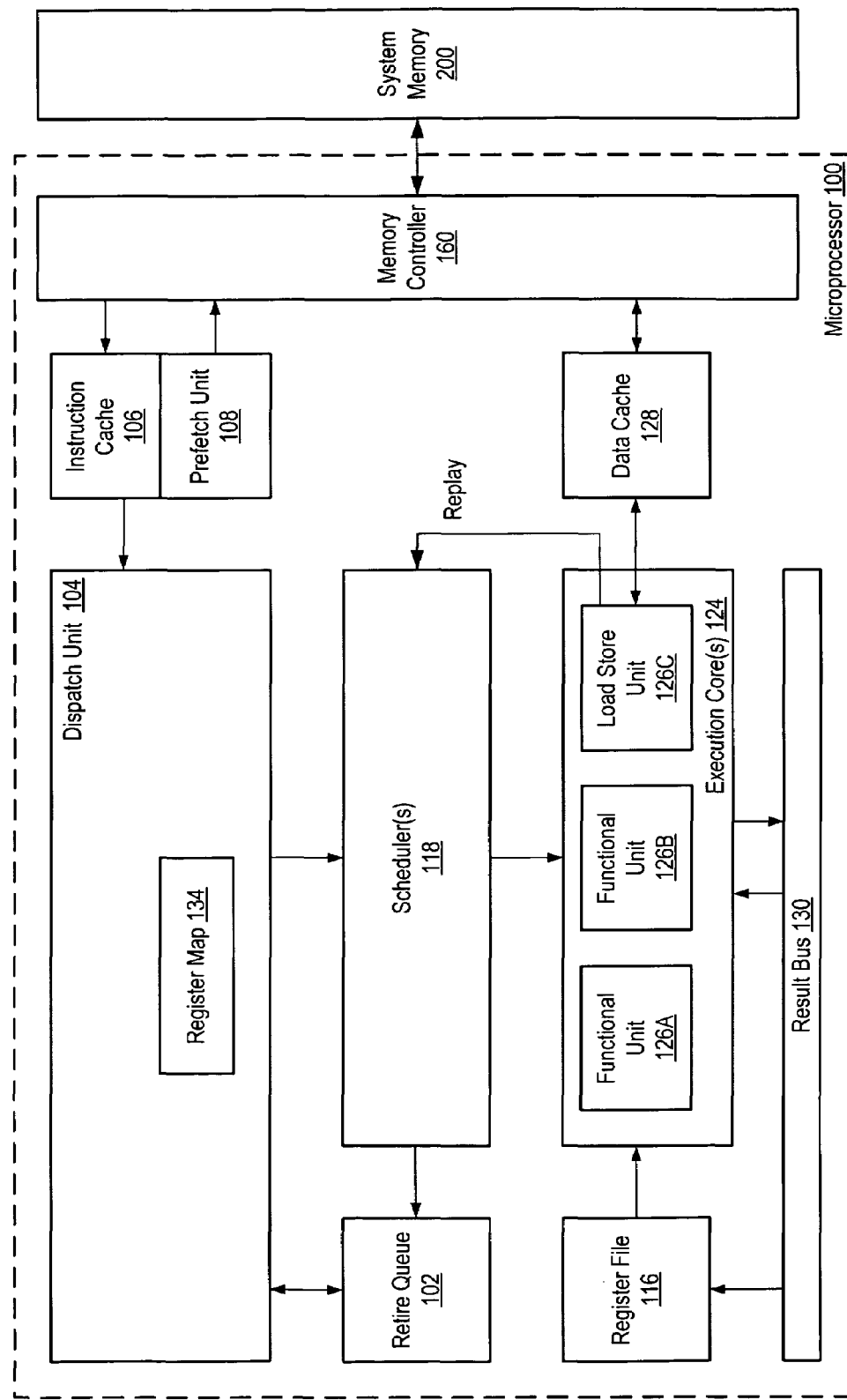
FIG. 1 is a block diagram illustrating a processor, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of one embodiment of a processor 100. Processor 100 is configured to execute instructions stored in a system memory 200. Many of these instructions operate on data stored in system memory 200. Note that system memory 200 may be physically distributed throughout a computer system and may be accessed by one or more processors 100.

Processor 100 may include an instruction cache 106 and a data cache 128. Processor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may each include a load/store unit configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue 102 may be configured to determine when each issued operation may be retired. In one embodiment, the processor 100 may be designed to be compatible with the x86 architecture. Note that processor 100 may also include many other components. For example, processor 100 may include a branch prediction unit (not shown).

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped). In some embodiments, there may be multiple levels of instruction and/or data cache 106 and 128. Some levels may be integrated with the processor 100, as shown, while other levels of cache may be external to the processor.

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data, and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. If an operation involves the update of a register, a register location within register file 116 may be reserved (e.g., upon decode of that operation) to store speculative register states (in an alternative embodiment, a reorder buffer may be used to store one or more speculative register states for each register). In some embodiments, dispatch unit 104 may implement a register map 134 that may translate logical register names of source and destination operands to physical register names in order to facilitate register renaming. Such a register map may also track which registers within register file 116 are currently allocated.

The processor 100 of FIG. 1 supports out of order execution. A retire queue 102 may keep track of the original program sequence for register read and write operations, allow for speculative instruction execution and branch misprediction recovery, and facilitate precise exceptions. Retire queue 102 may be implemented in a first-in-first-out configuration in which operations move to the "bottom" of the buffer as they are validated, making room for new entries at the "top" of the queue. Retire queue 102 may retire an operation in response to that operation completing execution and any data or control speculation performed on any operations, up to and including that operation in program order, being verified. Retire queue 102 may commit the speculative state of a physical register to the architectural state of processor 100 when the operation that generated the value in that physical register is retired. In some embodiments, retire queue 102 may be implemented as part of a reorder buffer. Such a reorder buffer may also provide data value storage for speculative register states in order to support register renaming. Note that in other embodiments, retire queue 102 may not provide any data value storage. Instead, as operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

If a required operand of a particular operation is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that is determined to modify the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a destination operand for an operation. Dispatch unit 104 may determine that register file 116 has one or more previously allocated physical registers assigned to a logical register specified as a source operand in a given operation. Register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 118) through load/store unit 126C, described below. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more functional units. For example, a reservation station is a scheduler. Operations in a scheduler or group of schedulers may also be referred to as operations in an instruction or operation window or scheduling window. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by functional units 126 (from register file 116 or result bus 130). In some embodiments, each scheduler 118 may be associated with a dedicated functional unit 126. In other embodiments, a single scheduler 118 may issue operations to more than one of the functional units 126.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect. As illustrated in FIG. 1, a load store unit 126C may provide a replay indication identifying one or more operations to be reissued to scheduler 118. For example, in one embodiment such a replay indication may include the tag of each operation to be replayed. In another embodiment, such a replay indication may include a bit corresponding to each load/store operation within scheduler 118, such that assertion of a particular bit may identify a corresponding operation to be replayed. Scheduler 118 may responsively reissue operations identified by a replay indication.

In one embodiment, each of the execution core(s) 124 may include several functional units 126 (e.g., functional units 126A-126C, as shown in FIG. 1). Some functional units, e.g., 126A, may be configured to perform integer arithmetic operations of addition and subtraction, as well as shifts, rotates, logical operations, and branch operations. Other functional units, e.g., 126B, may be configured to accommodate floating point operations. One or more of the functional units may be configured to perform address generation for load and store memory operations to be performed by a functional unit, e.g., 126C, that performs load and store operations to access data stored in data cache 128 and/or system memory. In one embodiment, such a functional unit 126C may be configured with a load store buffer with several storage locations for data and address information for pending loads and/or stores. Functional unit 126C may also be referred to herein as a load/store unit.

One or more functional units 126 may also provide information regarding the execution of conditional branch instructions to a branch prediction unit so that if a branch was mispredicted, the branch prediction unit may flush instructions subsequent to the mispredicted branch that have entered the instruction processing pipeline and redirect prefetch unit 106. The redirected prefetch unit 106 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in register file 116.

Results produced by functional units 126 within execution core(s) 124 may be output on the result bus 130 to the register file 116 if a register value is being updated. If the contents of a memory location are being changed, the results produced within execution core(s) 124 may be provided to the load/store unit 126C.

Data cache 128 is a cache memory provided to temporarily store data being transferred between execution core(s) 124 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

In some embodiments, a processor 100 may include an integrated memory controller 160, allowing the processor to interface directly to system memory 200. In other embodiments, memory controller 160 may be included in a bus bridge that indirectly couples processor 100 to system memory 200.

Dependency Prediction

As described herein, a data value is speculative if there is a possibility that the data value may found to be incorrect and consequentially recomputed. A speculative data value is one that cannot be identified with certainty as being correct or incorrect. A data value may be recomputed if that data value is the result of an operation for which some data speculation has been performed or if the data value depends on another speculative data value (e.g., if the data value is generated as the result of an operation having one or more speculative operands). A non-speculative value is a value that does not depend on any data speculation (such a value may still be subject to control speculation, however).

Various mechanisms within a processor 100 may perform data speculation. For example, in one embodiment load/store unit 126C may predict whether a given load is dependent on an older store operation before the store address is computed. Loads that are predicted to be independent of older stores may be freely scheduled with respect to store operations and allowed to execute speculatively. This type of data speculation is referred to herein as dependency prediction. In another example of dependency prediction, dispatch unit 104 may detect that a result of one operation may be used as a speculative operand for another operation. For example, dispatch unit 104 may predict that a load operation will access data stored to data cache 128 by a prior store operation. The dispatch unit 104 may responsively identify the data value stored in the register used as the source of the store operation as the speculative result of the load operation. Such dependency prediction may be extended in the dispatch unit 104 by linking the source of the store operation as a speculative operand source for operations specifying the result of the load operation as an operand.

Multiple different types of data speculation may be performed to produce some speculative results. For example, the speculative result of an integer operation may be generated using a predicted data value. This speculative result may then be stored by a store operation. A load operation may be predicted to be dependent on this store through dependency prediction, and thus the speculative result of the load operation is the speculative result of the integer operation.

Operations that depend on the result of operations on which data speculation has been performed may also generate speculative results. For example, if address prediction is used to generate the speculative result of a load operation, any dependent operations that execute using the load's speculative result as an operand may produce speculative results, which may in turn by used as operands by other dependent operations. Accordingly, if the underlying speculation in the load operation is determined to be incorrect, the dependent operations' results may also be incorrect, and thus the entire dependency chain of operations dependent on that load may need to be re-executed in order to produce correct results. On the other hand, if the underlying speculation is found to be correct, the dependent operations' results may be correct (assuming those results are not based on any other speculative values).

Many operations for which data speculation has been performed may be verified when those operations are executed by a functional unit. For example, the data prediction used to speculatively generate the result of an operation may be verified by the functional unit 126 that executes that operation by comparing the actual result of the operation with the speculative result. Such operations may not need to be re-executed if the data speculation is incorrect, since the correct result is already available. Other operations may be verified without being completely executed. For example, if a load with an uncomputed address forwarded its result from an earlier store (e.g., due to dependency or address prediction), the speculative result of the load may be verified when the load address is calculated. If the data speculation is incorrect, such an operation may need to be re-executed (at least partially) in order to generate the correct result.

Since operations for which data speculation has been performed and their dependent operations may need to be re-executed, retire queue 102 may be configured to only retire operations for which any underlying data speculation has resolved.

Load Store Unit with Dependency Prediction

In a processor that supports data-speculative execution, a load store unit 126C may be configured to predict whether a load operation is dependent upon an older store operation, and may allow load operations that are predicted to be independent to be freely scheduled relative to store operations, as described above. Additionally, a load store unit 126C may include a verification mechanism that detects incorrect dependency predictions and signals to the scheduler that incorrectly predicted operations should replay, causing the scheduler to reissue those operations to the load store unit 126C at a later time. It is noted that as used herein, references to load or store operations being older or younger than other operations are relative to the program order of the operations being compared. That is, a first operation that appears earlier in program order than a second operation may be referred to as being older than the second operation, and the second operation may be referred to as being younger than the first operation.

Figure 2:
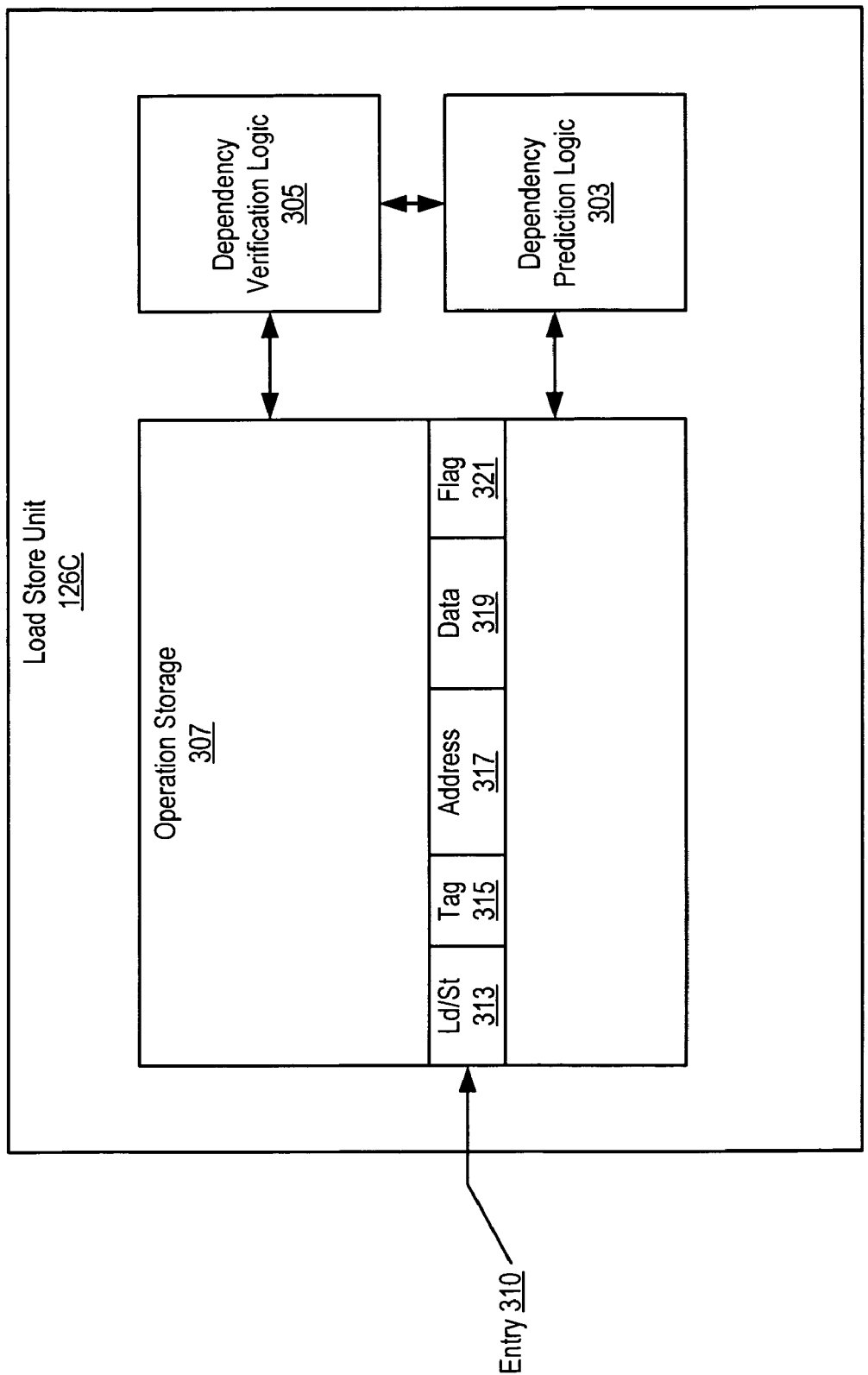
FIG. 2 is a block diagram illustrating a load store unit, according to one embodiment.

FIG. 2 illustrates one embodiment of a load store unit 126C that is configured to perform dependency prediction for load operations. In the illustrated embodiment, load store unit 126C includes dependency prediction logic 303 and dependency verification logic 305, each coupled to each other and to operation storage 307.

Dependency prediction logic 303 may be configured to perform dependency prediction of load operations issued to load store unit 126C. As described in greater detail below in conjunction with the description of FIG. 3A-3C, dependency prediction logic 303 may include local and/or global predictor data structures configured to store dependency prediction values corresponding to load operations. Dependency prediction logic 303 may be configured to access a dependency prediction value corresponding to a given load operation stored within operation storage 307. If the corresponding dependency prediction value indicates that the given load operation is predicted to be independent of older store operations, load store unit 126C may allow the given load operation to execute before the addresses of one or more older store operations have been computed.

Dependency verification logic 305 may be configured to verify data speculation performed by dependency prediction logic 303, as described in greater detail below. Dependency verification logic 305 may also be configured to verify data speculation performed by other portions of processor 100. For example, if dispatch unit 104 is configured to perform dependency prediction (e.g., by speculatively linking a load result to the source of an earlier store), dependency verification logic 305 may be configured to verify that dependency prediction.

Operation storage 307 may be configured to store operations that have been issued to load store unit 126C (e.g., by scheduler 118) but that have not yet completed execution. An operation issued to the load store unit on which data speculation has been performed may not be retired until that operation has been verified by dependency verification logic 305. Operation storage 307 may track all outstanding operations within the load store unit 126C. Operation storage 307 may include an entry 310 for each outstanding load and store.

An entry 310 may also include ld/st information 313 indicating whether the entry is allocated to a load or store (or, in some embodiments, an entry may indicate that it includes both a load and a store if it corresponds to an operation that operates on a value loaded from a memory address and stores the result to a memory address). Additionally, an entry 310 may include a tag 315 (e.g., identifying the operation and its result within the processor 100), an address 317, and/or data 319. In some embodiments, tag 315 may include the program counter value corresponding to the memory operation (e.g., the EIP value in embodiments implementing the x86 architecture). The data field 319 of each entry may, in some embodiments, include storage for both speculative and non-speculative data. Similarly, the address field 317 may include storage for more than one value of an operation's address (e.g., a speculative address generated by address prediction and a new address value generated by executing an operation) in some embodiments. In some embodiments, entries may include additional fields to identify operations and/or operands as data-speculative. For example, flag 321 may indicate that a particular load operation is predicted to be independent of older stores. Additionally, flag 321 may indicate whether a particular operation is dynamically predictable, as described in greater detail below. An entry 310 may be allocated in response to scheduler 118 issuing an operation to the load store unit 126C and deallocated in response to load store unit 126C completing execution of the operation.

Dependency verification logic 305 may verify some instances of dependency prediction by comparing the speculative result of an operation with the operation's actual result. For example, the speculative result of a load operation may be stored in that load's entry 310 within operation storage 307. When the actual result of that load operation is received from data cache 128, the dependency verification logic may compare the actual result to the speculative result stored in operation storage 307.

Dependency verification logic 305 may verify other instances of dependency prediction by comparing the address of an operation to the addresses of one or more earlier operations. For example, dependency verification logic 305 may include dedicated dependency verification comparators (not shown), or may use store-to-load forwarding comparators implemented in some embodiments of load store unit 126C. In one embodiment, a load may be predicted to be independent of older stores by dependency prediction logic 303 before the addresses of one or more older stores have been computed. When the addresses of one or more older stores become available, the comparators may be configured to compare the older store addresses against the address of the predicted-independent load operation. If any older store's address matches the address of the predicted-independent load operation, dependency verification logic 305 may indicate that the load operation was mispredicted. In some embodiments, dependency verification logic 305 may be configured to monitor and verify only those load operations predicted to be independent (for example, those load operations stored in operation storage 307 with flag values 321 indicating such a prediction). In other embodiments, dependency verification logic 305 may also be configured to detect whether loads predicted to be dependent are in fact independent of older stores.

In response to detecting a mispredicted dependency of a load operation, dependency verification logic 305 may cause the mispredicted load operations (and, in some embodiments, any operations dependent on or younger than the mispredicted load operation) to be replayed, and may also cause the dependency prediction logic 303 to be updated as described in greater detail below. An operation may be replayed by providing a replay signal identifying that operation to the scheduler 118. In response to such a signal, the scheduler 118 may mark the operation for replay (e.g., by modifying state information associated with that operation to indicate that the operation should be replayed). In one embodiment, dependence verification logic 305 may cause an operation to be replayed by providing that operation's tag to the scheduler 118 along with a flag indicating that the operation should be replayed. In embodiments that detect mispredictions of predicted-dependent load operations, dependency verification logic 305 may only update dependency prediction logic 303 without replaying the mispredicted load, since incorrectly predicting dependence of load operations may result only in performance degradation rather than incorrect computation. Additionally, in some embodiments where dependency prediction logic 303 includes counters configured to provide prediction hysteresis as described further below, dependency verification logic 305 may be configured to update dependency prediction logic 303 in the event of correct predictions as well as mispredictions.

In some embodiments, the correct result of a load operation with a mispredicted dependency may be already available. For example, a predicted-independent load operation may be actually dependent on a store operation, and the store data may be available, such as in data 319 of entry 310 corresponding to the store operation, for example. If the correct result of the incorrectly speculated load operation is already available, in some embodiments dependency verification logic 305 may cause load store unit 126C to broadcast the correct result of the incorrectly speculated load operation to the other components of the processor so that any dependent operations within other portions of the processor may re-execute using the correct value. Data speculation verification logic 305 may not cause such an incorrectly speculated load operation to be replayed in such embodiments. Note that the load store unit 126C may complete execution of an outstanding operation, even if the load store unit 126C also causes that operation to be replayed.

Dependency prediction logic 303 may implement a variety of data structures configured to predict whether a given load operation is dependent on an older store operation. In various embodiments, local predictors, global predictors, and hybrid predictors may be employed for dependency prediction.

Figure 3A:
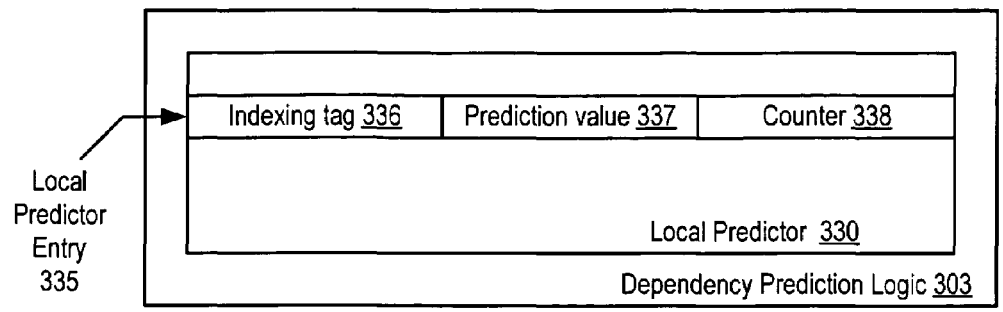
FIG. 3A is a block diagram illustrating one embodiment of dependency prediction logic including a local predictor data structure.

FIG. 3A illustrates one embodiment of dependency prediction logic including a local predictor data structure. In the illustrated embodiment, dependency prediction logic 303 includes a local predictor 330, which includes a plurality of local predictor entries 335. Each local predictor entry 335 includes an indexing tag 336 and a dependency prediction value 337. In the illustrated embodiment, each local predictor entry 335 also includes a counter 338, although in some embodiments the counter may be omitted as described further below. Counter 338 may be a multibit counter configured to saturate at its maximum and minimum values.

Each local predictor entry 335 may be configured to store dependency prediction information corresponding to a given load operation. A given local predictor entry 335 may be indexed by indexing tag 336, which in one embodiment may include the program counter value of a corresponding load operation. In other embodiments, it is contemplated that indexing tag 336 may include a value to identify a corresponding load operation that is other than a program counter value, such as a destination tag value or a load address value, for example. Indexing tag 336 may include an indication that the corresponding local predictor entry 335 is valid (i.e., allocated to a given load operation).

Identifying information corresponding to a load operation, such as its program counter value, may be provided to dependency prediction logic 303 when the load operation is issued to load store unit 126C. In the illustrated embodiment, local predictor 330 may compare the load's identifying information against the indexing tag 336 of each local predictor entry 335 to determine whether a valid predictor entry corresponding to the load operation exists, in an associative manner similar to the operation of a content-addressable memory (CAM). If a valid predictor entry exists, its corresponding dependency prediction value 337 (as well as the value of counter 338, if present) may be read out and stored within the entry 310 corresponding to the load operation in operation storage 307. If no valid predictor entry exists and there is a free local predictor entry 335 available, the free entry may be allocated to the load operation and the load's identifying information stored in indexing tag 336 of the free entry. Further, a default prediction value may be stored in dependency prediction value 337 of the free entry. For example, load operations may be predicted to be independent of older stores by default, so a prediction value indicative of predicted independence may be stored in this case.

Load store unit 126C may evaluate the dependency prediction value information read from local predictor 330 to allow a predicted-independent load operation to execute before the addresses of older store operations are computed. As described above, dependency verification logic 305 may detect that a dependency prediction of a given load operation is incorrect. In this event, dependency verification logic 305 may cause the local predictor entry 335 corresponding to the mispredicted load operation to be updated. For example, dependency verification logic 305 may first cause the corresponding local predictor entry 335 to be accessed within local predictor 330 by providing load operation identifying information in a manner similar to that described above. Once the appropriate local predictor entry 335 is selected, dependency verification logic 305 may cause the corresponding dependency prediction value 337 to be updated to reflect the misprediction.

In embodiments where counter 338 is not implemented, dependency prediction value 337 may be updated to store the correct dependency information as determined by dependency verification logic 305. In embodiments including counter 338, the counter value may be decremented in the event of a misprediction and incremented in the event of a correct prediction, and dependency prediction value 337 may be updated on a mispredict only when the corresponding counter 338 is at a minimum value. In such embodiments, counter 338 may provide hysteresis to dependence prediction, preventing the dependency prediction value from changing suddenly in response to a single correct or incorrect prediction. Counter 338 may be indicative of the strength of the dependency prediction in such embodiments (e.g., a larger counter value may indicate a stronger prediction, and a smaller counter value may indicate a weaker prediction).

As just described, in one embodiment local predictor 330 may include entries corresponding to load operations that are predicted either dependent or independent. However, in an alternative embodiment, local predictor 330 may be configured to allocate entries only to load operations that are predicted dependent. In such an embodiment, if a given load operation's identifying information fails to match any entry in local predictor 330 when the given load operation is issued to load store unit 126C, the load operation may be predicted independent by default. Subsequently, if dependency verification logic 305 detects that such a default prediction is incorrect, it may cause an entry to be allocated in local predictor 330 with the correct prediction. Also, in some embodiments, if dependency verification logic 305 detects that a predicted-dependent load operation is actually independent of older stores, it may be configured to deallocate the local predictor entry 335 corresponding to the mispredicted load operation. In embodiments where local predictor 330 is configured to allocate entries only to predicted-dependent load operations, the dependency prediction value 337 may be omitted from each local predictor entry 335.

When predicting a particular load operation, local predictor 330 may rely only on the past behavior of the particular load operation and not that of other load operations. Local predictor 330 therefore may be effective at predicting dependencies for load operations whose behavior is relatively static. In some instances, however, the dependence behavior of a given load operation may change depending on the behavior of other loads (i.e., the given load operation's dependency behavior may be dynamic). For example, a given load operation may be dependent on an older store operation only every other time the given load operation is issued, as determined by the behavior of a separate load operation. In such instances, a global predictor that takes into account the behavior of several load operations when predicting the behavior of a given may provide more accurate predictions.

Figure 3B:
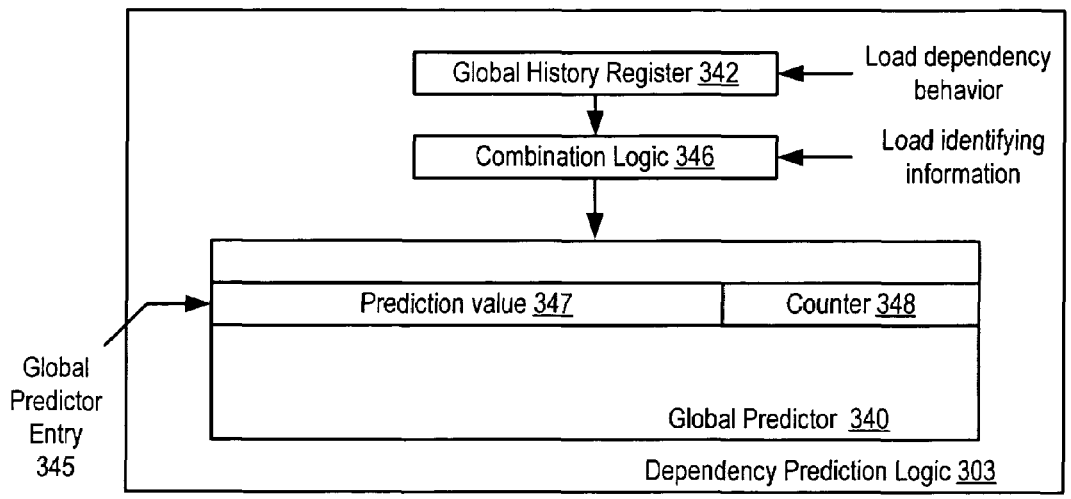
FIG. 3B is a block diagram illustrating one embodiment of dependency prediction logic including a global predictor data structure.

FIG. 3B illustrates one embodiment of dependency prediction logic including a global predictor data structure. In the illustrated embodiment, dependency prediction logic 303 includes a global predictor 340, which includes a global history register 342 coupled to a plurality of global predictor entries 345 through combination logic 346. Each global predictor entry 345 includes a global dependency prediction value 347 and a global counter 348, which may be a multibit counter configured to saturate at its maximum and minimum values.

Global history register 342 may be a shift register configured to store a plurality of bits, where each bit corresponds to the dependency behavior of a respective executed load operation. In one embodiment, the dependency behavior may correspond to the actual dependency behavior of the respective executed load operation, i.e., whether the respective executed load operation was in fact independent or dependent upon an older store operation. In another embodiment, the dependency behavior may correspond to the predicted dependency behavior of the respective executed load operation, which may be available sooner than the actual dependency behavior. The number of bits stored in global history register 342, and thus the number of executed load operations represented therein, may vary in various embodiments. In one embodiment, global history register 342 may be implemented as a programmable-width shift register.

In one embodiment, global history register 342 may be updated each time a load operation executes. Upon updating, the dependency behavior of the newly executed load operation may be shifted into the least significant bit position of global history register 342, and all remaining bit positions of global history register 342 may shift one bit position to the left, with the most significant bit of global history register 342 being discarded. In another embodiment, global history register 342 may be implemented as a right-shift register, with the dependency behavior of a newly executed load operation shifted into the most significant bit position and the least significant bit being discarded. In some embodiments, global history register 342 may shift by more than one bit position at a time to accommodate multiple load operations executing simultaneously.

The global dependency prediction value 347 of a given global predictor entry 345 may indicate a dependency prediction of a corresponding load operation, such as predicted dependent or independent. Global predictor counter 348 may be configured to store a value indicative of the strength of corresponding global dependency prediction value 347 for a given load operation, similar to counter 338 of local predictor entry 335 described above. In some embodiments, global predictor counter 348 may be updated by dependency verification logic 305 in the event that incorrect or correct predictions are detected, in a manner similar to that described above for local predictor 330.

When a given load operation is issued to load store unit 126C, combination logic 346 may be configured to combine the value included within global history register 342 with identifying information of the given load operation to yield an index value. The resulting index value may then be used to access a particular global predictor entry 345, and the corresponding global dependency prediction value 347 may be read out and stored within the entry 310 corresponding to the load operation in operation storage 307, where it may be used to modify scheduling of the load operation in a manner similar to that described above for local predictor 330. It is contemplated that in some embodiments, global predictor entry 345 may include validity information, such that load operations accessing unallocated entries within global predictor 340 may receive a default prediction.

Combination logic 346 may be configured to combine the value included within global history register 342, which may be indicative of the dependency history of several recently-executed load operations, with some specific identifying information of the given load operation for which a prediction is desired. For example, the program counter value corresponding to the given load operation may be used in one embodiment, while in other embodiments, identifying information such as a destination tag value or a load address may be used. The exact combination function performed by combination logic 346 may vary in various embodiments. In one embodiment, combination logic 346 may be configured to combine the value of global history register 342 with selected bits (such as least significant bits) of the program counter value of the given load instruction using a logical exclusive-OR (XOR) function to yield an index value that may be used to select a particular global predictor entry 345. In another embodiment, the index value may be derived by concatenating all or a portion of the value of global history register 342 with selected bits of the program counter value of the given load instruction.

Due to its inclusion of dependence history of more than one load operation, global predictor 340 may better predict the outcome of load operations with dynamic dependency behavior. However, in some embodiments, local predictor 330 and global predictor 340 may each exhibit better prediction accuracy than the other under different circumstances. Consequently, in some embodiments a hybrid predictor using both local and global types of predictors may be employed.

Figure 3C:
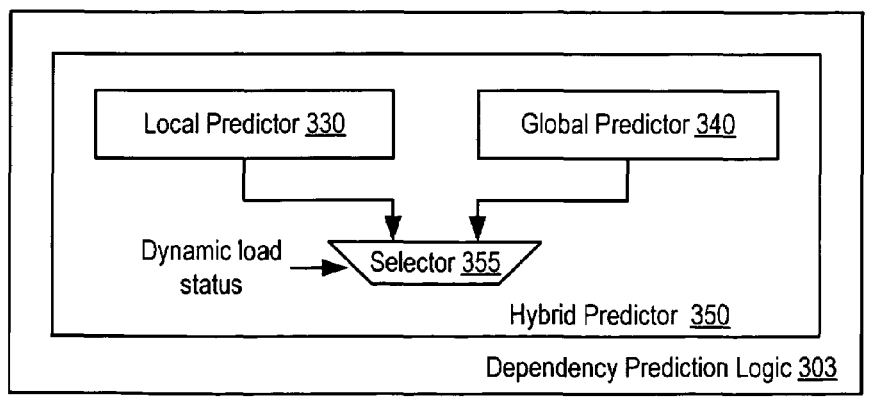
FIG. 3C is a block diagram illustrating one embodiment of dependency prediction logic including a hybrid predictor data structure.

FIG. 3C illustrates one embodiment of dependency prediction logic including a hybrid predictor data structure. In the illustrated embodiment, dependency prediction logic 303 includes a hybrid predictor 350 including a local predictor 330 and a global predictor 340, each coupled to a selector 355. The configuration and operation of local predictor 330 and global predictor 340 may be as described above in conjunction with the descriptions of FIGS. 3A and 3B, respectively.

In one embodiment, local predictor 330 may be configured as the default predictor, the prediction of which may be selected unless a given load operation is determined to be a dynamic load operation. In some embodiments, a load may be identified as a dynamic load operation by dependency verification logic 305, for example if local predictor 330 has mispredicted the load a certain number of times. In other embodiments, other functional units may indicate a dynamic load status. For example, in some embodiments a load may also be identified as dynamic at the operation decode stage based on its operands or addressing pattern.

In one embodiment, load operations stored in operation storage 307 of load store unit 126C may include a corresponding indication of whether the load is a dynamic load operation, for example stored in the flags field 321 of a given entry 310. In such an embodiment, the dynamic load indication may configure selector 355 to select the output of local predictor 330 or global predictor 340 if the load is indicated to be static or dynamic, respectively. Further, in such an embodiment, the unused predictor may be in a quiescent state while the selected predictor is accessed, thereby reducing the power consumption of hybrid predictor 350.

In an alternative embodiment, an indication of dynamic load status may be stored within a local predictor entry 335 corresponding to the dynamic load operation. For example, each local predictor entry 335 may be configured to include an additional field (not shown) indicating dynamic load status. In one version of such an embodiment, both local predictor 330 and global predictor 340 may be accessed concurrently for a given load operation, and the dynamic load status indication stored in corresponding local predictor entry 335 may configure selector 355 to select the output of the appropriate predictor. In another version of such an embodiment, global predictor 340 may be accessed dependent upon the value of the dynamic load status indication stored in corresponding local predictor entry 355, thereby potentially reducing power consumption.

Memory File and Dependence Prediction

In some embodiments of processor 100, a memory file may be implemented to facilitate identification of dependencies among load and store instructions. In such embodiments, the results of memory file operation may also be used to perform dependency prediction of load operations, as described in further detail below.

Figures 4A, 4B:
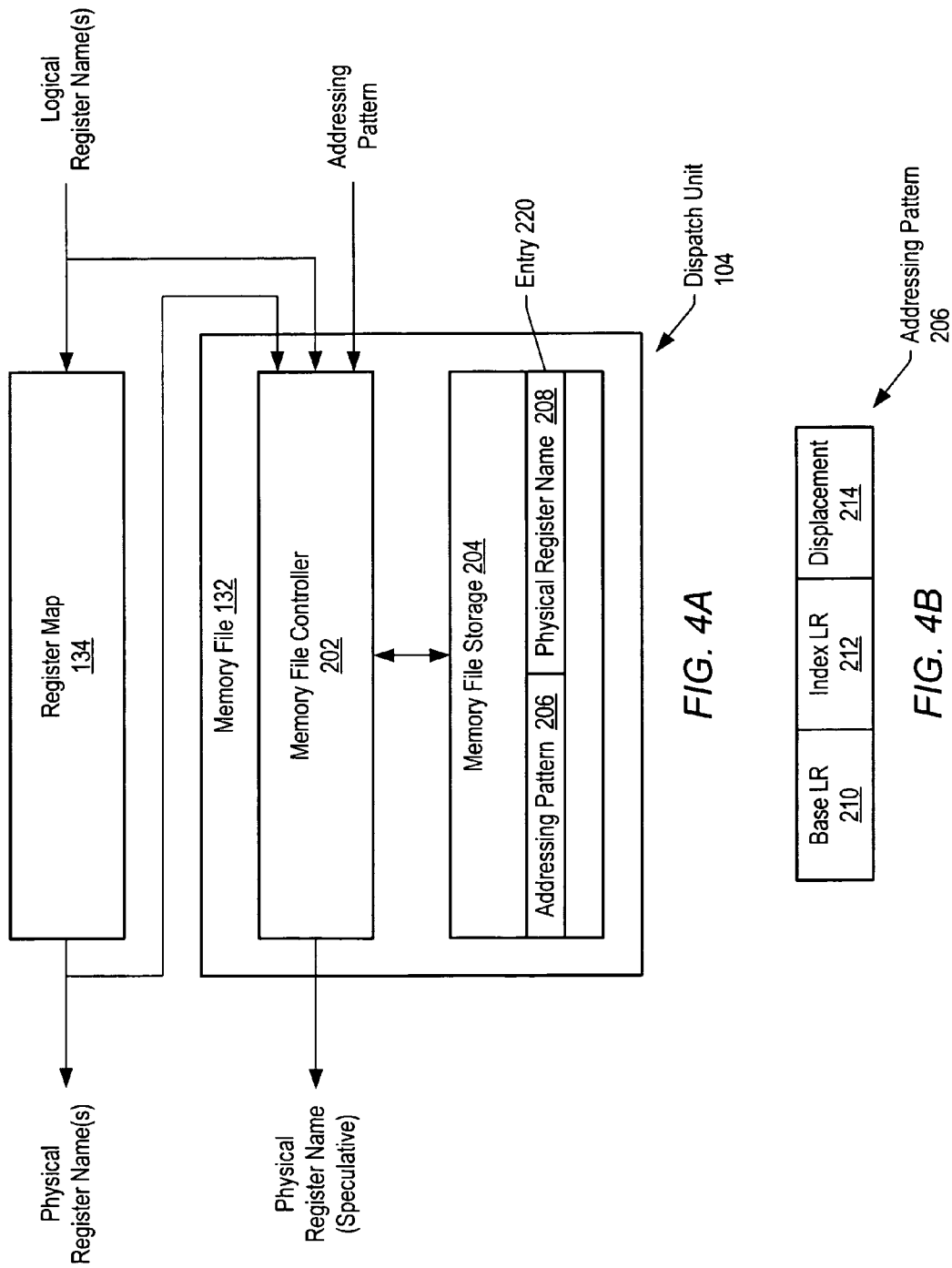
FIG. 4A is a block diagram illustrating one embodiment of a dispatch unit.
FIG. 4B is a block diagram illustrating an exemplary addressing pattern, according to one embodiment.

FIG. 4A shows one embodiment of a dispatch unit 104. In this embodiment, dispatch unit 104 includes a register map 134 and a memory file 132. As mentioned above in conjunction with the description of FIG. 1, register map 134 may be configured to provide register renaming. Register map 134 may receive logical register names for each source and destination operand and output the physical register names of the physical registers most recently assigned to the logical registers. Memory file 132 includes a memory file controller 202 and memory file storage 204.

Memory file storage 204 includes one or more entries 220. Each entry 220 may include an addressing pattern 206 and a tag 208 associated with that entry's addressing pattern. Each tag may identify a data value by indicating where that data value will be stored (e.g., within a reorder buffer or within a register file 116) when it is generated. For example, as shown in the illustrated embodiment, each tag may identify the physical register allocated to store that data value, as indicated by register map 134. Each addressing pattern may include all or some of the information used to specify an address in an operation. For example, referring briefly to FIG. 4B, an exemplary addressing pattern 206 is shown. In this embodiment, the addressing pattern 206 includes a base logical register name 210, an index logical register name 212, and a displacement 214. Some addressing patterns 206 may include a segment logical register name of a register identifying a particular segment in memory. Memory file storage 204 may be implemented from several registers, latches, flip-flops, or other clocked storage in some embodiments. In alternative embodiments, memory file storage 204 may include one or more RAM (Random Access Memory) cells.

Note that in some embodiments, the addressing pattern 206 stored in memory file storage 204 may include less than all of the addressing information specified for an operation. For example, entries in memory file storage 204 may store fewer than all of the bits used to specify a displacement within displacement field 214. In other embodiments, the memory file controller 202 may selectively choose whether to allocate an entry in memory file storage 204 dependent on whether an entry in the memory file can store all of the addressing information for a particular operation. For example, if each entry in memory file storage 204 stores up to 16 bits of displacement information and the addressing information for a particular operation includes 24 bits of displacement information, the memory file controller 202 may not allocate a memory file entry for that operation's addressing information.

Memory file controller 202 may compare the addressing patterns specified in undispatched operations to those stored within entries in memory file storage 204. If an operation's addressing pattern does not match any of the addressing patterns currently stored within entries in memory file storage 204 (i.e., the operation's addressing pattern misses in the memory file storage), memory file controller 202 may allocate a new entry in memory file storage 204 to store all or some of that operation's addressing pattern. If there are no free entries to allocate within memory file storage 204, memory file controller 202 may select an entry to overwrite using a replacement scheme such as LRU (Least Recently Used), FIFO (First In, First Out), random replacement, etc.

In addition to storing the operation's addressing pattern within the allocated entry, the memory file controller 202 may also store a physical register name 208, which may include a tag (e.g., the name of the physical register) identifying a value being loaded from or stored into the memory location identified by that operation's addressing pattern. For example, if a load operation that loads data from memory is being handled, the entry allocated in response to that load operation may store the name of the physical register allocated to store the result of the load operation. If a store operation that writes data to a memory location is being handled, memory file controller 202 may store the physical register name of the register in which the store's source value is stored in memory file storage 204.

If an operation's addressing pattern (or a portion of that pattern) is already stored in an entry in memory file 204 (i.e., the operation's addressing pattern hits in the memory file storage), the memory file controller 202 may use or modify the entry containing the matching addressing pattern. If a load operation (an operation that loads a value from a particular address into a register) is being handled, the memory file controller 202 may output the physical register name 208 stored in the matching entry. If a store operation (an operation that stores a value from a register to a particular address) is being handled, the memory file controller 202 may overwrite the tag (e.g., physical register name 208) stored in the matching entry with the tag of the data being stored.

If a load operation is being handled and the load operation hits in the memory file storage 204, the tag output by the memory file controller 202 may be used to link the stored value identified by the tag to a speculative result of the load operation. For example, in some embodiments, when the load operation is dispatched to scheduler(s) 118, the tag output by memory file 132 may also be provided to the scheduler(s) (e.g., as a speculative source operand tag). A scheduler 118 may issue the load operation in response to the availability (e.g., in register file 116 or on result bus 130) of the value identified by that tag. An execution core 124 may execute the load operation so that the linked value is broadcast as the speculative result of the load operation on result bus 130 (note that the data value produced as the load's result may not itself be flagged or otherwise identified as a speculative value in some embodiments). In other embodiments, the data value may be linked to the speculative result of the load operation by storing the tag in a speculative map.

As a result of the link, the data value identified by the tag may be forwarded as the speculative result of the load once the data value is available (e.g., in register file 116 or on result bus 130) in order to allow dependent operations to execute using the speculative result. In many cases, this may allow dependent operations to execute using the speculative result of the load operation sooner than if their execution is delayed until the non-speculative result of the load operation becomes available.

Additionally, when a load operation is linked to a data value as described above, memory file 132 may be configured to convey an indication of the link to scheduler 118 along with the load operation's operand tag information (for example, memory file 132 may send an additional bit of status indicating the link). When the load operation is issued to load store unit 126C along with an indication that the load operation is linked, flag 321 of the entry 310 allocated to the load operation may be configured to indicate that the load operation is predicted dependent. In one embodiment, dependency prediction logic 303 may detect the link status and indicate the dependency prediction accordingly. However, in another embodiment, dependency prediction logic 303 and dependency verification logic 305 may be omitted from load store unit 126C. In such an embodiment, memory file 132 may provide the only indication of dependency prediction for load operations.

Figure 5:
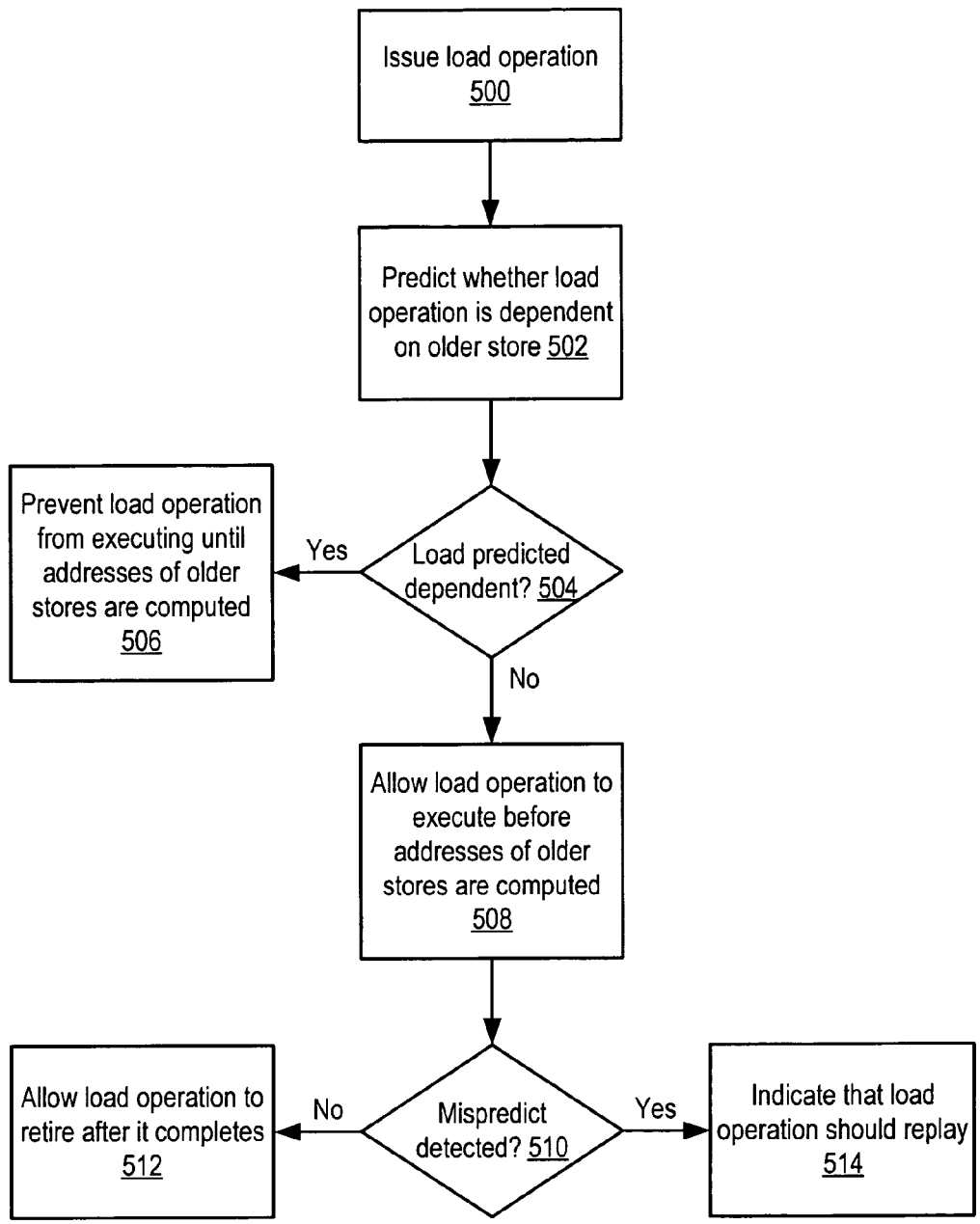
FIG. 5 is a flowchart illustrating one embodiment of a method of predicting whether a given load operation is dependent upon an older store operation.

FIG. 5 illustrates one embodiment of a method of predicting whether a given load operation is dependent upon an older store operation. Referring collectively to FIG. 1 through FIG. 4B, operation begins in block 500 where a load operation is issued to load store unit 126C. Responsive to the load operation being issued, dependency prediction logic 303 may be configured to predict whether the load operation is dependent upon an older store operation (block 502). For example, in one embodiment dependency prediction logic 303 may be configured to access local predictor 330 to predict load dependency, while in other embodiments global predictor 340 or hybrid predictor 350 may be used, or dependency prediction information may be received from other units such as memory file 132.

In response to the prediction, load store unit 126C may be configured to determine the type of the prediction (block 504). If the load operation is predicted dependent, load store unit 126C may be configured to prevent it from executing until the addresses of store operations older than the load have been computed (block 506). If the load operation is predicted independent, load store unit 126C may be configured to allow it to execute before the addresses of one or more older store operations have been computed (block 508).

Subsequent to determining that the load operation is predicted independent, load store unit 126C may be configured to detect whether the load operation has been mispredicted (block 510). For example, in one embodiment load store unit 126C may include store-to-load forwarding comparators configured to detect whether the address of the predicted-independent load operation matches an address of an older store operation. If no misprediction has occurred, the load operation may be allowed to retire once it has completed (block 512). If a misprediction is detected, load store unit 126C may be configured to provide a replay indication to scheduler 118 in response, indicating that the predicted-independent load operation should be reissued at a future time (block 514).

It is noted that although the various embodiments of dependency prediction logic 303 including different combinations of local and global predictors have been described as features of load store unit 124C, it is contemplated that in some embodiments, these variants of dependency prediction logic 303 may be located within a different unit of microprocessor 100, such as dispatch unit 104, for example. It is further contemplated that various combinations of the embodiments of FIG. 3A through FIG. 4 are possible. For example, it is contemplated that dependence prediction derived from memory file 134 may be implemented with or without a local or global predictor.

Exemplary Computer Systems

Figure 6:
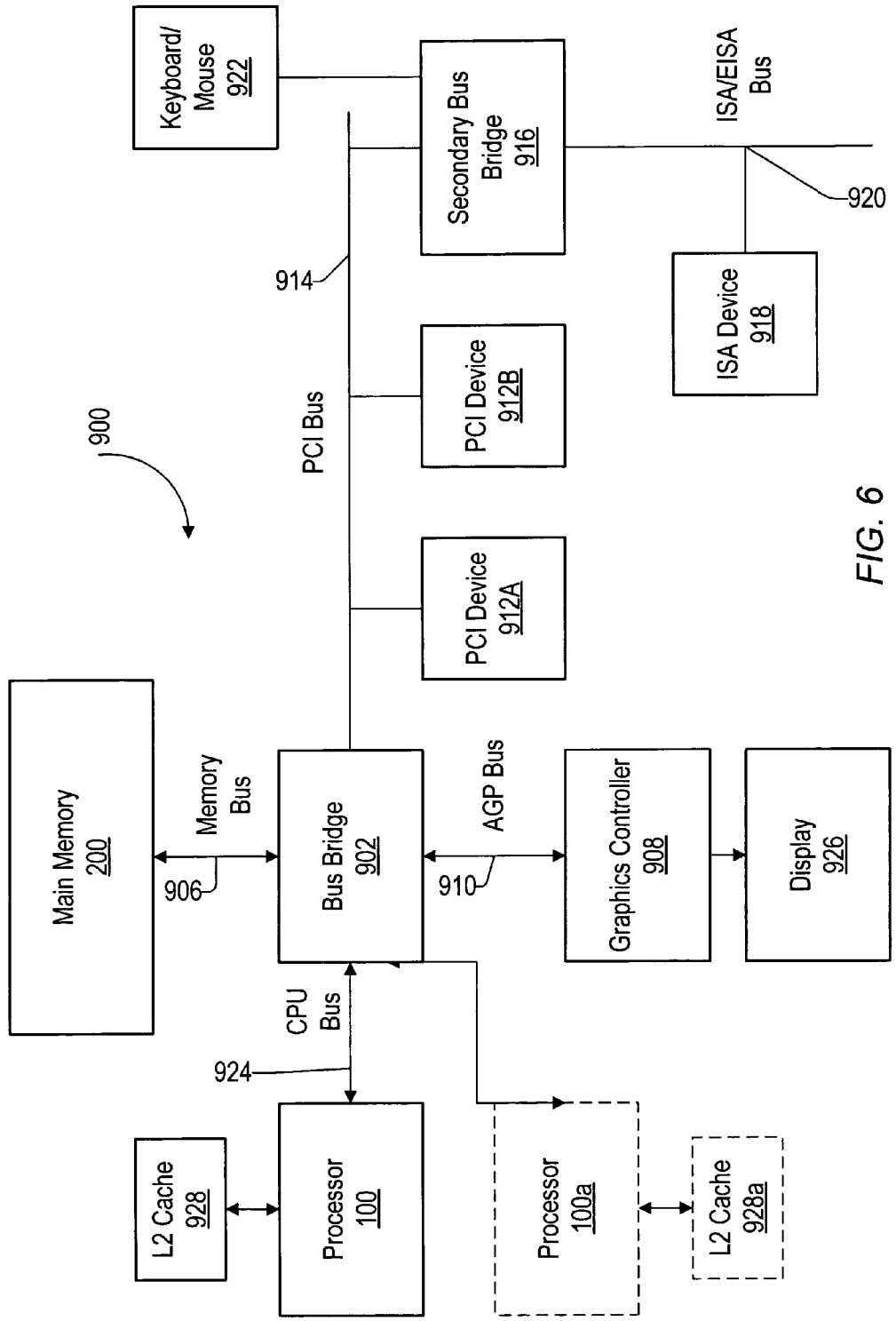
FIG. 6 is a block diagram illustrating an exemplary computer system, according to one embodiment.

FIG. 6 shows a block diagram of one embodiment of a computer system 900 that includes a processor 100 coupled to a variety of system components through a bus bridge 902. Processor 100 may include an embodiment of a load store unit as described above. Other embodiments of a computer system are possible and contemplated. In the depicted system, a main memory 200 is coupled to bus bridge 902 through a memory bus 906, and a graphics controller 908 is coupled to bus bridge 902 through an AGP bus 910. Several PCI devices 912A-912B are coupled to bus bridge 902 through a PCI bus 914. A secondary bus bridge 916 may also be provided to accommodate an electrical interface to one or more EISA or ISA devices 918 through an EISA/ISA bus 920. In this example, processor 10 is coupled to bus bridge 902 through a CPU bus 924 and to an optional L2 cache 928. In some embodiments, the processor 100 may include an integrated L1 cache (not shown).

Bus bridge 902 provides an interface between processor 100, main memory 200, graphics controller 908, and devices attached to PCI bus 914. When an operation is received from one of the devices connected to bus bridge 902, bus bridge 902 identifies the target of the operation (e.g., a particular device or, in the case of PCI bus 914, that the target is on PCI bus 914). Bus bridge 902 routes the operation to the targeted device. Bus bridge 902 generally translates an operation from the protocol used by the source device or bus to the protocol used by the target device or bus.

In addition to providing an interface to an ISA/EISA bus for PCI bus 914, secondary bus bridge 916 may incorporate additional functionality. An input/output controller (not shown), either external from or integrated with secondary bus bridge 916, may also be included within computer system 900 to provide operational support for a keyboard and mouse 922 and for various serial and parallel ports. An external cache unit (not shown) may also be coupled to CPU bus 924 between processor 100 and bus bridge 902 in other embodiments. Alternatively, the external cache may be coupled to bus bridge 902 and cache control logic for the external cache may be integrated into bus bridge 902. L2 cache 928 is shown in a backside configuration to processor 100. It is noted that L2 cache 928 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 912A-912B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 918 is illustrative of various types of peripheral devices, such as a modem, a sound card, and a variety of data acquisition cards such as GPIB or field bus interface cards.

Graphics controller 908 is provided to control the rendering of text and images on a display 926. Graphics controller 908 may embody a typical graphics accelerator generally known in the art to render three-dimensional data structures that can be effectively shifted into and from main memory 200. Graphics controller 908 may therefore be a master of AGP bus 910 in that it can request and receive access to a target interface within bus bridge 902 to thereby obtain access to main memory 200. A dedicated graphics bus accommodates rapid retrieval of data from main memory 200. For certain operations, graphics controller 908 may further be configured to generate PCI protocol transactions on AGP bus 910. The AGP interface of bus bridge 902 may thus include functionality to support both AGP protocol transactions as well as PCI protocol target and initiator transactions. Display 926 is any electronic display upon which an image or text can be presented. A suitable display 926 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 900 may be a multiprocessing computer system including additional processors (e.g., processor 100a shown as an optional component of computer system 900). Processor 100a may be similar to processor 100. More particularly, processor 100a may be an identical copy of processor 100. Processor 100a may be connected to bus bridge 902 via an independent bus (as shown in FIG. 6) or may share CPU bus 924 with processor 100. Furthermore, processor 100a may be coupled to an optional L2 cache 928a similar to L2 cache 928.

Figure 7:
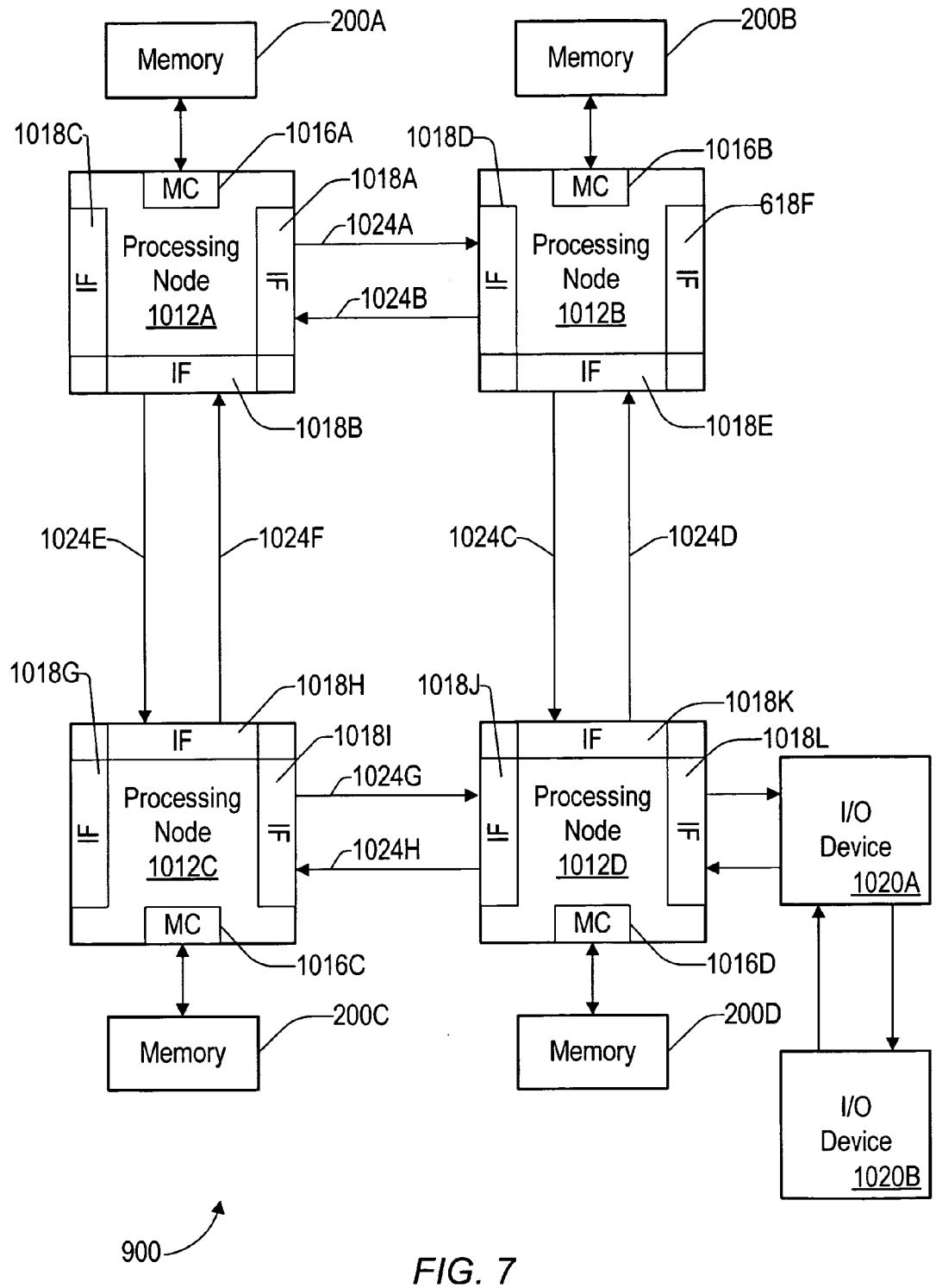
FIG. 7 is a block diagram illustrating an exemplary computer system, according to another embodiment.

Turning now to FIG. 7, another embodiment of a computer system 900 that may include a processor 100 having an embodiment of a load store unit as described above is shown. Other embodiments are possible and contemplated. In the embodiment of FIG. 7, computer system 900 includes several processing nodes 1012A, 1012B, 1012C, and 1012D. Each processing node is coupled to a respective memory 200A-200D via a memory controller 1016A-1016D included within each respective processing node 1012A-1012D. Additionally, processing nodes 1012A-1012D include interface logic used to communicate between the processing nodes 1012A-1012D. For example, processing node 1012A includes interface logic 1018A for communicating with processing node 1012B, interface logic 1018B for communicating with processing node 1012C, and a third interface logic 1018C for communicating with yet another processing node (not shown). Similarly, processing node 1012B includes interface logic 1018D, 1018E, and 1018F; processing node 1012C includes interface logic 1018G, 1018H, and 1018I; and processing node 1012D includes interface logic 1018J, 1018K, and 1018L. Processing node 1012D is coupled to communicate with a plurality of input/output devices (e.g., devices 1020A-1020B in a daisy chain configuration) via interface logic 1018L. Other processing nodes may communicate with other I/O devices in a similar fashion.

Processing nodes 1012A-1012D implement a packet-based link for inter-processing node communication. In the present embodiment, the link is implemented as sets of unidirectional lines (e.g., lines 1024A are used to transmit packets from processing node 1012A to processing node 1012B and lines 1024B are used to transmit packets from processing node 1012B to processing node 1012A). Other sets of lines 1024C-1024H are used to transmit packets between other processing nodes as illustrated in FIG. 7. Generally, each set of lines 1024 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 1012A to processing node 1012D may pass through either processing node 1012B or processing node 1012C as shown in FIG. 7. Any suitable routing algorithm may be used. Other embodiments of computer system 900 may include more or fewer processing nodes then the embodiment shown in FIG. 7.

Generally, the packets may be transmitted as one or more bit times on the lines 1024 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 1012A-1012D, in addition to a memory controller and interface logic, may include one or more processors. Broadly speaking, a processing node comprises at least one processor and may optionally include a memory controller for communicating with a memory and other logic as desired. More particularly, each processing node 1012A-1012D may include one or more copies of processor 100. External interface unit may include the interface logic 1018 within the node, as well as the memory controller 1016.

Memories 200A-200D may comprise any suitable memory devices. For example, a memory 200A-200D may comprise one or more RAMBUS DRAMs (RDRAMs), synchronous DRAMs (SDRAMs), static RAM, etc. The address space of computer system 900 is divided among memories 200A-200D. Each processing node 1012A-1012D may include a memory map used to determine which addresses are mapped to which memories 200A-200D, and hence to which processing node 1012A-1012D a memory request for a particular address should be routed. In one embodiment, the coherency point for an address within computer system 900 is the memory controller 1016A-1016D coupled to the memory storing bytes corresponding to the address. In other words, the memory controller 1016A-1016D is responsible for ensuring that each memory access to the corresponding memory 200A-200D occurs in a cache coherent fashion. Memory controllers 1016A-1016D may comprise control circuitry for interfacing to memories 200A-200D. Additionally, memory controllers 1016A-1016D may include request queues for queuing memory requests.

Interface logic 1018A-1018L may comprise a variety of buffers for receiving packets from the link and for buffering packets to be transmitted upon the link. Computer system 900 may employ any suitable flow control mechanism for transmitting packets. For example, in one embodiment, each interface logic 1018 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 1020A-1020B may be any suitable I/O devices. For example, I/O devices 1020A-1020B may include devices for communicate with another computer system to which the devices may be coupled (e.g., network interface cards or modems). Furthermore, I/O devices 1020A-1020B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A processor, comprising:
    a scheduler configured to issue operations; and
    a load store unit coupled to receive memory operations issued by the scheduler and configured to execute the memory operations; and
    a predictor comprising a plurality of entries, wherein each of said entries includes a dependence prediction value and a counter indicative of a strength of a corresponding dependence prediction value, wherein said dependence prediction value comprises a bit which predicts whether a given load is dependent upon an older store;
    wherein said load store unit is further configured to:
        predict whether a given load operation is dependent upon an older store operation by accessing a given predictor entry of said entries corresponding to said given load operation, and evaluating a given dependence prediction value included in said given predictor entry;
        execute said given load operation before an address of said older store operation is computed in response to predicting that said given load operation is independent of said older store operation;
        detect whether said given load operation has been mispredicted subsequent to predicting that said given load operation is independent of said older store operation, the misprediction relating to whether the given load operation is dependent upon the older store operation; and
        provide a replay indication to said scheduler indicating that said load operation should be reissued in response to detecting that said given load operation has been mispredicted.

2. The microprocessor as recited in claim 1, wherein said predictor is a local predictor comprising a plurality of local predictor entries.

3. The microprocessor as recited in claim 2, wherein said load store unit is further configured to update a local predictor entry corresponding to said given load operation in response to detecting that said given load operation has been mispredicted.

4. The microprocessor as recited in claim 1, wherein said predictor is a global predictor comprising a global history register and a plurality of global predictor entries, wherein said global history register is configured to store a plurality of respective dependency values corresponding to a plurality of executed load operations.

5. The microprocessor as recited in claim 1, wherein said load store unit includes:
   a local predictor comprising a plurality of local predictor entries, wherein each of said plurality of local predictor entries includes a dependence prediction value; and
   a global predictor comprising a global history register and a plurality of global predictor entries, wherein said global history register is configured to store a plurality of respective dependency values corresponding to a plurality of executed load operations, wherein each of said plurality of global predictor entries includes a dependence prediction value; and wherein said load store unit is further configured to predict whether said given load operation is dependent upon said older store operation by:
   determining whether said given load operation is a dynamic load operation;
   in response to determining that said given load operation is not a dynamic load operation, accessing a given local predictor entry corresponding to said given load operation and evaluating a local dependence prediction value included in said given local predictor entry; and
   in response to determining that said given load operation is a dynamic load operation, accessing a given global predictor entry corresponding to said global history register and evaluating a global dependence prediction value included in said given global predictor entry.

6. The microprocessor as recited in claim 1, further comprising a memory file coupled to said load store unit and including an entry configured to store a first addressing pattern and a first tag, wherein the memory file is configured to compare the first addressing pattern included in the entry to a second addressing pattern corresponding to the given load operation, wherein if the second addressing pattern matches the first addressing pattern stored in the entry, the memory file is configured to link a data value identified by the first tag to a speculative result of the given load operation, and wherein predicting whether said given load operation is dependent on said older store operation comprises detecting whether a link corresponding to said given load operation exists.

7. The microprocessor as recited in claim 1, wherein said load store unit includes store-to-load forwarding comparators, and wherein said store-to-load forwarding comparators are configured to detect whether said given load operation has been mispredicted by detecting whether an address of said given load operation matches an address of a given older store operation.

8. A method, comprising:
   receiving a load operation;
   predicting whether said load operation is dependent upon an older store operation by accessing a given predictor entry, of a plurality of predictor entries each of said entries including a dependence prediction value and a counter indicative of a strength of a corresponding dependence prediction value, corresponding to said given load operation and evaluating said dependence prediction value included in said given predictor entry, wherein said dependence prediction value comprises a bit which predicts whether a given load is dependent upon an older store;
   executing said load operation before an address of said older store operation is computed in response to predicting that said given load operation is independent of said older store operation;
   detecting whether said load operation has been mispredicted subsequent to predicting that said load operation is independent of said older store operation, the misprediction relating to whether the given load operation is dependent upon the older store operation; and
   providing a replay indication to a scheduler configured to issue operations indicating that said load operation should be reissued in response to detecting that said load operation has been mispredicted.

9. The method as recited in claim 8, wherein said plurality of predictor entries are a plurality of local predictor entries.

10. The method as recited in claim 9, further comprising updating said local predictor entry in response to detecting that said load operation has been mispredicted.

11. The method as recited in claim 8, wherein said plurality of predictor entries are a plurality of global predictor entries predicting whether said load operation is dependent upon said older store operation comprises accessing a global predictor entry corresponding to a global history register and evaluating a dependence prediction value included in said global predictor entry, wherein said global history register is configured to store a plurality of respective dependency values corresponding to a plurality of executed load operations.

12. The method as recited in claim 8, wherein predicting whether said load operation is dependent upon said older store operation comprises:
   determining whether said load operation is a dynamic load operation;
   in response to determining that said load operation is not a dynamic load operation, accessing a local predictor entry corresponding to said load operation and evaluating a local dependence prediction value included in said local predictor entry; and
   in response to determining that said load operation is a dynamic load operation, accessing a global predictor entry corresponding to a global history register and evaluating a global dependence prediction value included in said global predictor entry, wherein said global history register is configured to store a plurality of respective dependency values corresponding to a plurality of executed load operations.

13. The method as recited in claim 8, further comprising:
   storing a first addressing pattern and a first tag;
   comparing said first addressing pattern to a second addressing pattern corresponding to said load operation;
   if said second addressing pattern matches said first addressing pattern, linking a data value identified by said first tag to a speculative result of said load operation;
   wherein predicting whether said load operation is dependent on said older store operation comprises detecting whether a link corresponding to said load operation exists.

14. The method as recited in claim 8, wherein detecting whether said load operation has been mispredicted comprises detecting whether an address of said load operation matches an address of a given older store operation.

15. A computer system, comprising:
a memory; and
a processor coupled to the memory, wherein the processor comprises:
a scheduler configured to issue operations; and
a load store unit coupled to receive memory operations issued by the scheduler and configured to execute the memory operations; and
a predictor comprising a plurality of entries, wherein each of said entries includes a dependence prediction value and a counter indicative of a strength of a corresponding dependence prediction value, wherein said dependence prediction value comprises a bit which predicts whether a given load is dependent upon an older store;
wherein said load store unit is further configured to:
predict whether a given load operation is dependent upon an older store operation by accessing a given predictor entry corresponding to said given load operation and evaluating a given dependence prediction value included in said given predictor entry;
execute said given load operation before an address of said older store operation is computed in response to predicting that said given load operation is independent of said older store operation;
detect whether said given load operation has been mispredicted subsequent to predicting that said given load operation is independent of said older store operation, the misprediction relating to whether the given load operation is dependent upon the older store operation; and
provide a replay indication to said scheduler indicating that said load operation should be reissued in response to detecting that said given load operation has been mispredicted.

16. The computer system as recited in claim 15, wherein said predictor is a local predictor comprising a plurality of local predictor entries.

17. The computer system as recited in claim 15, wherein said predictor is a global predictor comprising a global history register and a plurality of global predictor entries, wherein said global history register is configured to store a plurality of respective dependency values corresponding to a plurality of executed load operations, wherein each of said plurality of global predictor entries includes a dependence prediction value, and wherein said load store unit is further configured to predict whether said given load operation is dependent upon said older store operation by accessing a given global predictor entry corresponding to said global history register and evaluating a given dependence prediction value included in said given global predictor entry.

18. The computer system as recited in claim 15, wherein said load store unit includes:
a local predictor comprising a plurality of local predictor entries, wherein each of said plurality of local predictor entries includes a dependence prediction value; and
a global predictor comprising a global history register and a plurality of global predictor entries, wherein said global history register is configured to store a plurality of respective dependency values corresponding to a plurality of executed load operations, wherein each of said plurality of global predictor entries includes a dependence prediction value; and wherein said load store unit is further configured to predict whether said given load operation is dependent upon said older store operation by:
determining whether said given load operation is a dynamic load operation;
in response to determining that said given load operation is not a dynamic load operation, accessing a given local predictor entry corresponding to said given load operation and evaluating a local dependence prediction value included in said given local predictor entry; and
in response to determining that said given load operation is a dynamic load operation, accessing a given global predictor entry corresponding to said global history register and evaluating a global dependence prediction value included in said given global predictor entry.

19. The computer system as recited in claim 15, further comprising a memory file coupled to said load store unit and including an entry configured to store a first addressing pattern and a first tag, wherein the memory file is configured to compare the first addressing pattern included in the entry to a second addressing pattern corresponding to the given load operation, wherein if the second addressing pattern matches the first addressing pattern stored in the entry, the memory file is configured to link a data value identified by the first tag to a speculative result of the given load operation, and wherein predicting whether said given load operation is dependent on said older store operation comprises detecting whether a link corresponding to said given load operation exists.

20. The computer system as recited in claim 15, wherein said load store unit includes store-to-load forwarding comparators, and wherein said store-to-load forwarding comparators are configured to detect whether said given load operation has been mispredicted by detecting whether an address of said given load operation matches an address of a given older store operation.

21. The microprocessor as recited in claim 1, wherein the predictor comprises a shift register configured to store a plurality of bits, where each bit corresponds to the dependency behavior of a respective executed load operation.

22. The method as recited in claim 8, further comprising maintaining a shift register configured to store a plurality of bits, where each bit corresponds to the dependency behavior of a respective executed load operation.

23. The computer system as recited in claim 15, wherein the predictor comprises a shift register configured to store a plurality of bits, where each bit corresponds to the dependency behavior of a respective executed load operation.

* * * * *